United States Patent [19]

Makita et al.

[11] Patent Number: 4,993,354
[45] Date of Patent: Feb. 19, 1991

[54] APPARATUS FOR COATING THIN LIQUID FILM ON SOLID SURFACE

[75] Inventors: Kensuke Makita, Mie; Toshiaki Itoh, Tsu; Naohiko Matuda, Matsusaka, all of Japan

[73] Assignee: Central Glass Company, Limited, Ube, Japan

[21] Appl. No.: 227,673

[22] Filed: Aug. 3, 1988

[30] Foreign Application Priority Data

Aug. 6, 1987 [JP] Japan .................. 62-195239

[51] Int. Cl.$^5$ .................................................. B05C 3/09
[52] U.S. Cl. .................................................. 118/407
[58] Field of Search .............. 118/404, 406, 407, 410, 118/415, 428, 602, 400, 401, 405, 421

[56] References Cited

U.S. PATENT DOCUMENTS

| | | | |
|---|---|---|---|
| 2,127,413 | 8/1938 | Leguillon | 118/421 |
| 3,052,565 | 9/1962 | Chinn et al. | 118/415 |
| 3,084,662 | 4/1963 | Badger | 118/404 |
| 3,690,965 | 9/1972 | Bergh et al. | 118/415 |
| 3,692,592 | 9/1972 | Marinelli | 118/415 |
| 3,905,325 | 9/1975 | Labore et al. | 118/401 |
| 3,980,046 | 9/1976 | Homan | 118/407 |
| 4,018,953 | 4/1977 | Martellock | 118/404 |
| 4,821,675 | 4/1989 | Ikeno et al. | 118/415 |

FOREIGN PATENT DOCUMENTS

| | | |
|---|---|---|
| 709572 | 5/1954 | United Kingdom . |
| 1208122 | 10/1970 | United Kingdom . |
| 1248887 | 10/1971 | United Kingdom . |

*Primary Examiner*—Willard Hoag
*Attorney, Agent, or Firm*—Fleit, Jacobson, Cohn, Price, Holman & Stern

[57] ABSTRACT

A thin liquid coating film is coated on a surface of a solid substrate, e.g. a glass plate, by using an incomplete liquid container having an opening of a shape similar to the shape of the surface of the substrate on one side thereof. First the substrate and the incomplete container are brought into tight contact with each other such that the side opening of the container is closed by the surface of the substrate, whereby the container is completed. Next, a coating liquid is fed into the container to thereby wet the substrate surface, and then liquid is extracted from the container so as to lower the liquid level in the container at a predetermined rate while keeping both the container and the substrate stationary. By this method a submicron coating film of uniform thickness can easily be formed even on large-sized substrate, and it is easy to form a coating film on only a limited area of the substrate surface without using any masking.

8 Claims, 4 Drawing Sheets

APPARATUS FOR COATING THIN LIQUID FILM ON SOLID SURFACE

BACKGROUND OF THE INVENTION

This invention relates to a method of coating a thin liquid film on a desired surface of a solid member, either in a limited area of the surface or over the entire area, and to apparatus for use in the coating method. For example, the coating method is suitable for use in forming a thin coating film of a method oxide on a relatively large substrate by a sol-gel method using a solution of a metal alkoxide.

Conventional wet coating methods include dip coating method in which the substrate is dipped into a coating liquid and then pulled out at a constant speed, flow coating method in which a coating liquid is flowed from an upper edge of the substrate so as to spread on the substrate surface and roller coating method in which the substrate is carried by a pair of rolls at least one of which is always wetted with the coating liquid.

However, in many cases and particularly in the cases of coating relatively large substrates difficulty or inconvenience is experienced in accomplishing desired coating by any of convention wet coating methods. As to flow coating method and roller coating method, coating of only a selected area of a substrate has to be accomplished by first coating the entire area of the substrate and then removing the coating film in the unwanted areas by a troublesome technique such as etching, because it is impracticable to apply masking tape or the like to the unwanted areas. Besides, by either of these coating methods it is very difficult to form a coating film having a submicron and well controlled thickness.

For forming a submicron coating film by a wet coating method, dip coating method is generally accepted as most suitable. However, coating of a large-sized substrate by this method entails large-scale machinery for handling the substrate to dip it into the coating liquid and then pull out it. Morever, transverse stripes are liable to appear in the coating film because in pulling out the substrate it is inevitable that vibration of the substrate causes oscillation of the liquid level. It is very difficult to form a broad and uniformly thin coating film by this method. Besides, coating of only a limited area of a substrate surface by dip coating method takes a lot of time and trouble because it is necessary to mask not only the unwanted areas of the substrate surface but also the entire area of the opposite surface of the substrate or, alternatively, to first coat the substrate or, alternatively, to first coat the entire areas of the both surfaces and then remove the coating film in the unwanted areas of the front surface and over the entire area of the opposite surface.

SUMMARY OF THE INVENTION

It is an object of the present invention to provide a novel method of coating a thin liquid film on a surface of a solid member, by which method a uniformly good coating film having a desired thickness can be formed easily and efficiently even when the solid surface has a wide area and/or is to be coated only in a limited area.

It is another object of the invention to provide apparatus for use in the coating method according to the invention.

According to the invention there is provided a method of coating a thin liquid film on a surface of a solid member, the method using an incomplete liquid container which has an opening of a shape similar to the shape of said surface of the solid member on one side thereof and comprising the steps of (a) bringing the solid member and the incomplete container into tight contact with each other such that said opening of the incomplete containing is closed by said surface of the solid member thereby completing the container, (b) introducing a coating liquid into the container until the liquid level in the container reaches a predetermined level and (c) extracting the coating liquid from the container so as to lower the liquid level in the container at a predetermined rate while keeping both the solid member and the container stationary.

In the coating member according to the invention, the step (b) of introducing the coating liquid into the completed container corresponds to the dipping step in a conventional dip coating method. That is, at the end of the step (b) the intended coating area of the solid surface is wetted with the coating liquid. At the step (c), which is performed after stabilization of the liquid level in the container at a constant rate. In effect this step corresponds to the pull-out step in a conventional dip coating method.

According to the invention coating of a liquid film on the solid surface is accomplished without moving the solid member, and the film thickness is determined by the viscosity of the coating liquid and the rate of lowering of the liquid level in the container. Therefore it is easy to control the coating film thickness, and it is practicable to form a submicron coating film with good uniformity of thickness even when the solid member is large in size. Furthermore, by the method of the invention it is easy to form a coating film on only a selected area of a surface of a solid member since the size of the coating film is determined by the size of the side opening of the incomplete container. There is no need of masking the unwanted areas of the surface or removing a large portion of the coating film.

The coating method of the invention is very suitable for partial coating of a solid surface, and it is also possible to form a coating film over the entire area of a solid surface, such as one major surface of a plate, by making the incomplete container and its side opening sufficiently large. This invention has wide applications and will be very favorable for the manufacture of, for example, various reflectors, ornamental plates and combiners for head-up displays.

Another aspect of the present invention is an apparatus for coating a liquid film on a surface of a solid member. The apparatus comprises means for holding the solid member, an incomplete liquid container having an opening of a shape similar to the shape of said surface of the solid member on one side thereof, means for bringing the solid member and the incomplete container into tight contact with each other such that the side opening of the incomplete container is closed by said surface of the solid member thereby completing the container and keeping the container and the solid member stationary in the tightly contacting state, means for introducing a coating liquid into the container, and means for extracting the coating liquid from the container at a predetermined rate.

In a preferred embodiment of the coating apparatus, the coating liquid extracting means comprises a tube which extends from a hole in the bottom of the aforementioned container to a coating liquid reservoir and means for moving the reservoir to change its vertical position. In another preferred embodiment, the coating liquid extracted means comprises a pipe which extends downward from a hole in the bottom of the aforementioned container and is provided with a valve of which the degree of opening is controllable.

In the present invention usually the side opening of the incomplete container is made somewhat broader than the intended coating area of the solid surface in view of the following facts. When a liquid film is coated on a solid surface, surface tension causes slight swelling of the liquid film in its marginal regions along the respective edges so that the film becomes nonuniform. When the finished coating film is to serve an optical function, changes in optical characteristics in the marginal regions of the film becomes a matter of serious concern. Hence it is necessary to remove a marginal region of 5–20 mm width along every edge of the coating film. However, it is not indispensable to remove the marginal regions of the coating film when slight nonuniformity in the film does not raise a serious problem as in the case of a protective coating film of $SiO_2$ by way of example. In such a case the side opening of the incomplete container may be made equal in size to the intended coating area of the solid surface.

DESCRIPTION OF THE PREFERRED EMBODIMENTS

Figure 1:
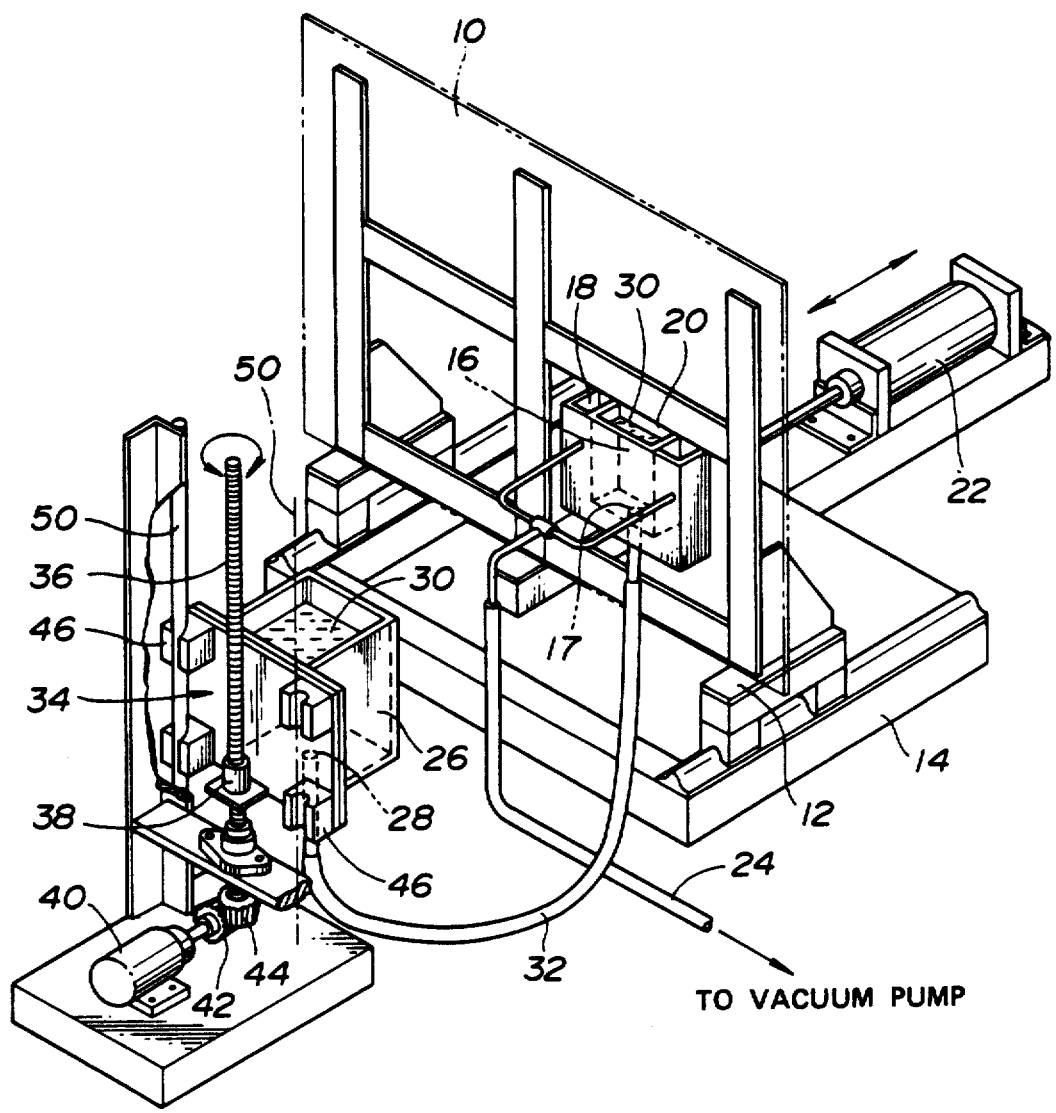
FIG. 1 is a perspective view of a coating apparatus embodying the present invention.

FIG. 1 shows an example of coating apparatus according to the invention. This apparatus is for coating a liquid film on a selected area of a flat substrate 10 such as a glass sheet. The substrate 10 is held vertically on a stand 12 placed on a base 14. A lidless box-like incomplete container 16 is held stationary on a suitable support (omitted from illustration to avoid complicacy). The incomplete container 16 is open at the top and at one of the four sides. As mentioned hereinbefore, the opening 20 on the side of the incomplete coating 16 is similar in shape to the intended coating area of the substrate surface and is usually slightly broader than the intended coating area. The incomplete container 16 is placed such that the opening 20 faces the substrate 10. By operating an air cylinder 22 the stand 12 holding the substrate 10 can be moved toward the incomplete container 16 or backward. When the substrate 10 is brought into contact with the incomplete container 16 the opening 20 is completely closed by the substrate 10, whereby a container is completed. For example, the incomplete container 16 is made of plates of a hard plastic, and elastic packings (not shown) are provided along the edges of the opening 20. In this embodiment the incomplete container 16 partly has a double wall structure to provide hollow sections 18 on the righthand and lefthand sides, and a pipe 24 connects the hollow sections 18 to a vacuum pump (not shown).

The coating apparatus includes a coating liquid reservoir 26 having a small hole 28 in the bottom. The incomplete container 16 too has a small hole 17 in the bottom. Using these holes 28 and 17, a tube 32 provides communication between the reservoir 26 and the incomplete containing 16 so that a coating liquid 30 can be supplied to the incomplete container 16 after closing the opening 20 by the substrate 10.

The coating liquid reservoir 26 is vertically movably supported by a lifting mechanism 34, which includes a threaded pole 36, a nut 38 which meshes with the threaded pole 36 and is fixed to the reservoir 26, a motor 40 having a horizontal shaft provided with a bevel gear 42 at its protruding end, a bevel gear 44 which is fixed to the threaded pole 36 at its lower end to engage with the bevel gear 42, a pair of vertical guide rails 50 and sliders 46 attached to the reservoir 26 and filled on the guide rails 58.

Figure 2:
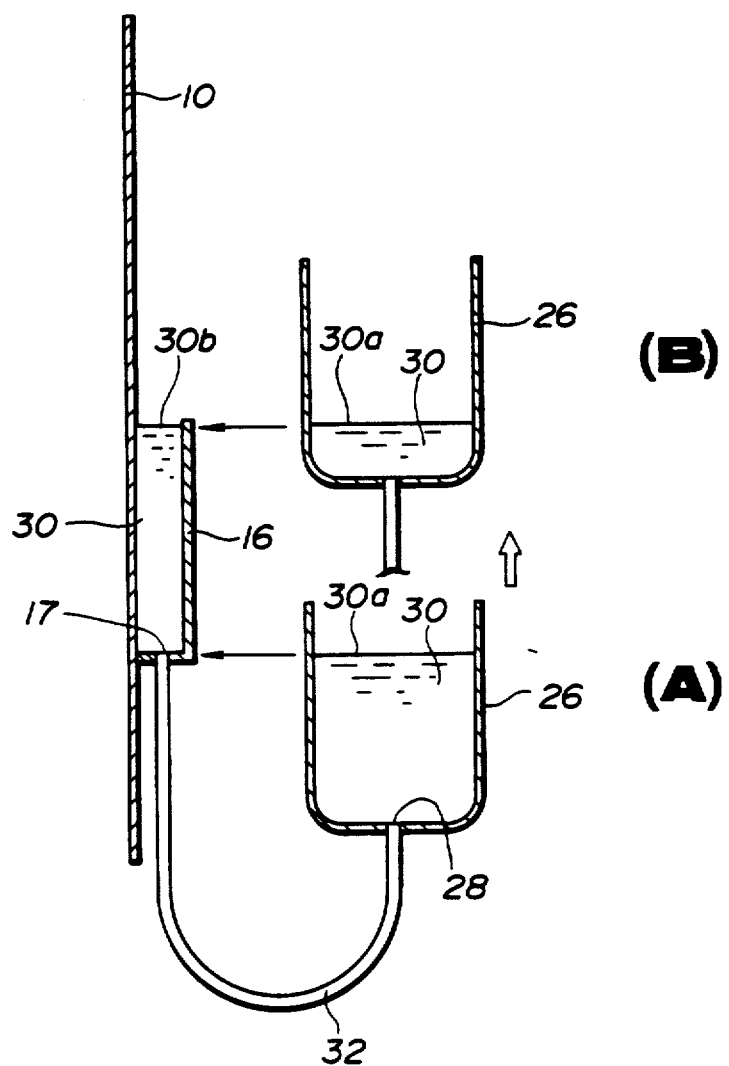
FIG. 2 is an illustration for explanation of the principal function of the coating apparatus of FIG. 1.

In the operating the coating apparatus, initially the reservoir 26 is held at a sufficiently low position such that, as shown at (A) in FIG. 2, the level 30a of the coating liquid 30 in the reservoir 26 is below the bottom of the incomplete container 16. In such a state the substrate 10 is brought into tight contact with the incomplete container 16. The vacuum pump to which the pipe 24 is connected is operated to suck air from the hollow sections 18 to thereby enhance tightness of contact of the substrate 10 with the incomplete container 16. Next, the motor 40 is operated to turn the threaded pole 36 so as to lift the reservoir 26 at a constant speed up to the position shown at (B) in FIG. 2. Such a lift of the reservoir 26 causes the level 30b of the coating liquid 30 in the container 16 to rise at a constant rate from the initial null state to a predetermined level. When the liquid level 30b in the container 16 stabilizes at the predetermined level, the motor 40 is reversely turned to lower the reservoir 26 at a constant speed to the initial position shown at (A) in FIG. 2. This operation causes the liquid level 30b in the container 16 to lower at a constant rate until the coating liquid 30 is completely extracted from the container 16. After that the hollow sections 18 of the container 16 is allowed to resume normal pressure, and then the air cylinder 22 is operated to retract the stand 12 on which the substrate 10 is held. The substrate 10 is detached from the stand 12 and subjected to drying and heat treatment to convert the liquid film coated thereon into a solid coating film.

Assuming that the substrate 10 is a glass sheet for use as a combiner in a head-up display and that the size of the thin film to be coated on the substrate is specified to be 100 mm × 100 mm, it is suitable that the opening 20 of the incomplete container 16 is about 110 mm × 110 mm in dimensions. After air drying of a 110 mm × 110 mm liquid coating film formed by the above described method, a conventional etching treatment is made to remove a 5-mm wide marginal region of the coating film along its each edge to thereby adjust the dimensions of the coating film to 100 mm × 100 mm in advance of the final heat treatment.

EXAMPLE 1

Using a coating apparatus of the type shown in FIG. 1, a coating liquid comprising a solution of a titanium alkoxide as the principal component was coated on a selected area of a glass sheet by the method described with reference to FIGS. 1 and 2. In the coating operation the coating liquid reservoir 26 was lowered from the lifted position at such a speed that the liquid level 30b in the container 16 lowered at a constant rate of 2 mm/sec. After the coating operation the glass sheet was detached from the apparatus and left to natural cooling for about 30 sec, and then the glass sheet was heated in an electric furnace at 550° C. for 5 min. As the result, a film of $TiO_2$ having a thickness of about 1000Å was formed on the glass sheet.

Figure 3:
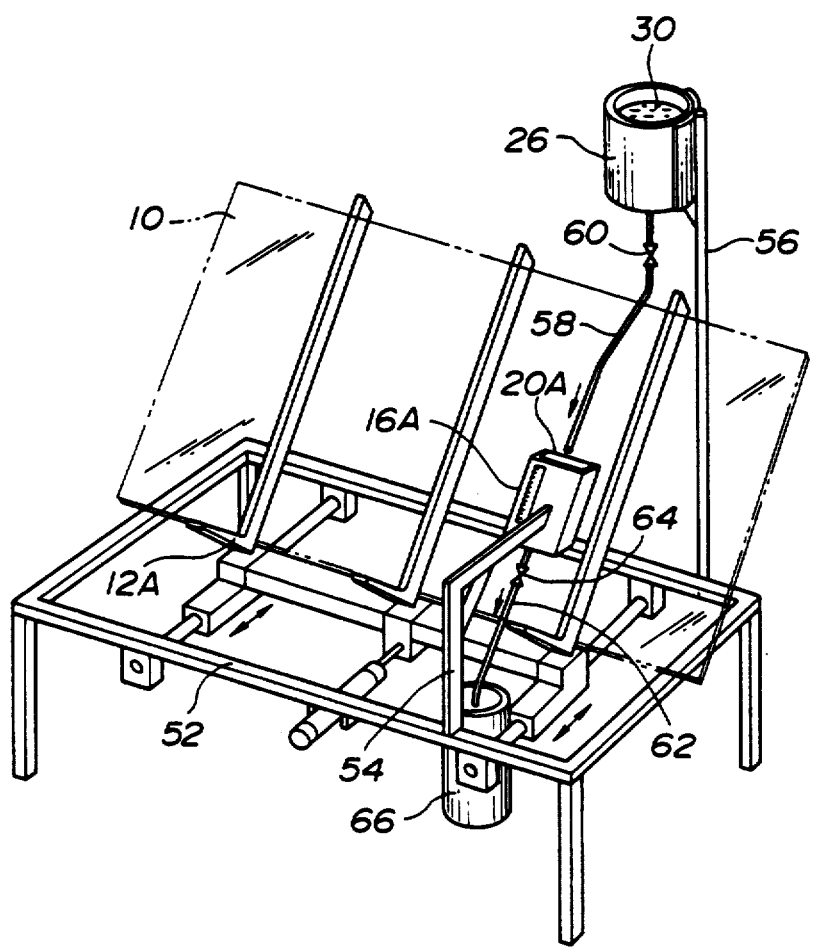
FIG. 3 is a perspective view of another embodiment of coating apparatus according to the invention.

FIG. 3 shows another example of coating apparatus according to the invention. A flat substrate 10 such as a glass sheet is held inclined on a stand 12A which is installed on a bed 52 and can be moved reciprocatively as indicated by arrows. A lidless box-like incomplete container 16A is held inclined and stationary by an angled bar 54 fixed to the bed 52. The incomplete container 16A is open at the top and at one side facing the substrate 10. A pole 56 standing on the bed 52 holds a coating liquid reservoir 26 such that the bottom of the reservoir 26 is higher than the top of the incomplete container 16A. The reservoir 26 has a small hole (not shown) in the bottom, and a pipe 58 having a valve 60 extends downward from the hole to the open top of the incomplete container 16A. The incomplete container 16A has a small hole (not shown) in the bottom, and a pipe 62 having a valve 64 extends downward from the hole to a liquid recovering vessel 66.

In operating the coating apparatus, first the stand 12A is moved to bring the substrate 10 into tight contact with the incomplete container 16A. Preferably the incomplete container 16A has a double wall structure (omitted from illustration) to provide hollow sections which are to be evacuated for enhancement of tightness of contact of the substrate 10 with the incomplete container 16A. As the side opening 20A of the incomplete container 16A is closed by the substrate 10, a liquid container is completed. Then the valve 60 is opened to feed the coating liquid 30 into the container 16A until the liquid level in the container 16A reaches a predetermined level. Then the valve 60 is closed, and, after stabilization of the liquid level in the container 16A, the valve 64 is opened so as to lower the liquid level in the container 16A at a predetermined rate. The wet coating operating comes to an end when the container 16A is emptied of the coating liquid 30. Then the stand 12A holding the substrate 10 is retracted, and the substrate 10 is subjected to usual drying and heat treatment.

EXAMPLE 2

Using a coating apparatus of the type shown in FIG. 3, a coating liquid comprising a solution of a titanium alkoxide as the principal component was coated on a selected area of a glass sheet. In the above described wet coating operation the degree of opening of the valve 64 was controlled such that the liquid level in the container 16A lowered at a constant rate of about 3 mm/sec. After natural drying of the liquid coating film the glass sheet was heated in an electric furnace at 550° C. for 5 min. As the result of a film of $TiO_2$ having a thickness of about 1000U was formed on the glass sheet.

The present invention is not limited to the above described and illustrative embodiments. Besides $TiO_2$, representative examples of thin films to be formed by using the present invention are $SiO_2$ films, $ZrO_2$ films and $Al_2O_3$ films for optical and other purposes and dichromate gelatin films for holograms, and the coating liquid can be selected from various solutions and dispersions. The material of the substrate or solid member to be coated is not limited either. Besides glass, metals, plastics and ceramics can be coated by the method of the invention. It is possible to use pumps or the like as means for feeding a coating liquid into the container in contact with the object of coating and then extracting the liquid from that container.

Figure 4:
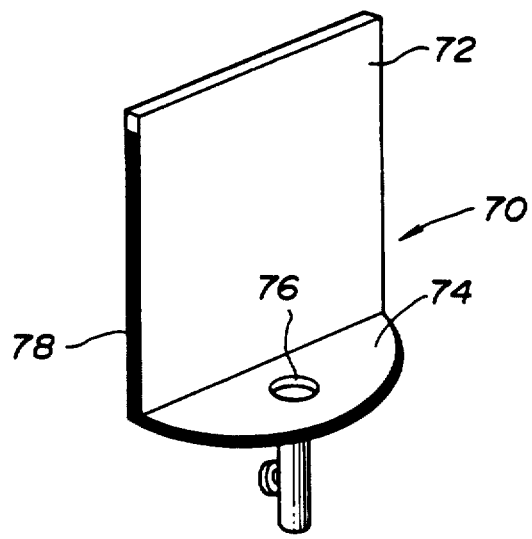
FIG. 4 is a perspective view of an incomplete container for use in coating a liquid film on a semi-cylindrical solid surface by the method according to the invention.
Figure 5:
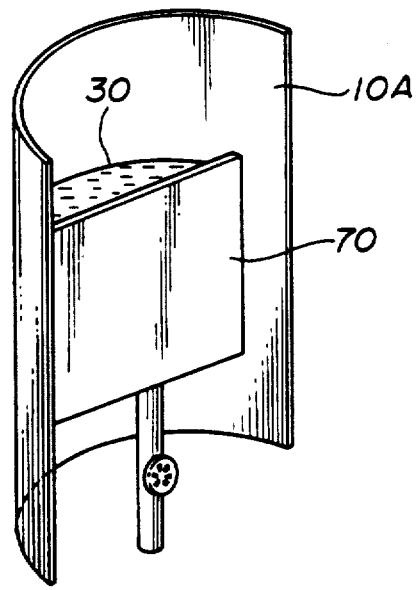
FIG. 5 illustrates the manner of attachment of the incomplete container of FIG. 4 to a semicylindrical substrate to be coated.

The incomplete container employed in the present invention can variously be designed according to the shape of the solid surface to be coated. The solid surface may be a curved surface. For example, FIG. 4 shows an incomplete container 70 for use in coating a liquid film on a semicylindrical solid surface. The incomplete contained 70 has a rectangular side wall 72 and a semicircular bottom 74 with a small hole 76. Numeral 78 indicates elastic packing applied to edges. Referring to FIG. 5, in the coating operation a concave surface of a semicylindrical substrate 10A comes into tight contact with the incomplete container 70 along the side edges of the rectangular wall 72 and the semi-circular edge of the bottom 74. This means that the incomplete container 70 is complemented by a semi-cylindrical wall. In the thus completed container 70, a coating liquid 30 contacts with the semicylindrical surface of the substrate 10A.

What is claimed is:

1. An apparatus for coating a thin liquid film on a surface of a solid member, the apparatus comprising:
   means for holding the solid member;
   an incomplete liquid container having an opening of a shape similar to the shape of said surface of the solid member on a lateral side thereof;
   means for bringing the solid member and said incomplete container into tight contact with each other such that said opening of the incomplete container is closed by said surface of the solid member thereby completing the container and keeping the container and the solid body stationary in the tightly contacting state;
   means for introducing a coating liquid into the container kept in contact with the solid member; and
   means for extracting the coating liquid from the container kept in contact with the solid member at a predetermined rate, thereby gradually lowering the liquid level in the container and gradually decreasing the area of contact of the coating liquid with said surface of the solid member.

2. An apparatus according to claim 1, wherein said means for introducing the coating liquid into said containing and said means for extracting the coating liquid are unitary and comprise a coating liquid reservoir, a tube which provides communication between said reservoir and said container in contact with the solid member through the bottom of said container and means for moving said reservoir so as to change the vertical position of the reservoir.

3. An apparatus according to claim 1, wherein said opening of said incomplete container is smaller in area than said surface of the solid member.

4. An apparatus according to claim 1, wherein said opening of said incomplete container is approximately equal in area to said surface of the solid member.

5. An apparatus according to claim 1, wherein said incomplete container is in the form of a rectangular box, said surface of the solid member being a flat surface.

6. An apparatus according to claim 1, wherein said means for extracting the coating liquid comprises a pipe which extends downward from a hole in the bottom of said container and a valve which is provided to said pipe and of which the degree of opening is controllable.

7. An apparatus according to claim 6, wherein said means for introducing the coating liquid into said container comprises a coating liquid reservoir held at a position higher than the top of said container, a feed pipe which extends downward from said reservoir toward the top of said container and a valve which controls the flow of the coating liquid through said feed pipe.

8. An apparatus for coating a thin liquid film on a surface of a solid member, the apparatus comprising:
 means for holding the solid member;
 an incomplete liquid container having an opening of a shape similar to the shape of said surface of the solid member on a lateral side thereof and further having an approximately semi-circular bottom plate and a rectangular side wall which stands on the diametrical edge of said bottom plate;
 means for bringing the solid member and said incomplete container into tight contact with each other such that said opening of the incomplete container is closed by said surface of the solid member thereby completing the container and keeping the container and the solid body stationary in the tightly contacting state;
 means for introducing a coating liquid into the container kept in contact with the solid member; and
 means for extracting the coating liquid from the container kept in contact with the solid member at a predetermined rate, thereby gradually lowering the liquid level in the container and gradually decreasing the area of contact of the coating liquid with said surface of the solid member; and
 wherein the surface of the solid member is a concave and approximately semi-cylindrical surface.

* * * * *